US012311588B2

United States Patent
Enomoto et al.

(10) Patent No.: US 12,311,588 B2
(45) Date of Patent: May 27, 2025

(54) INJECTION MOLDING MACHINE

(71) Applicant: SHIBAURA MACHINE CO., LTD., Tokyo (JP)

(72) Inventors: Jun Enomoto, Numazu (JP); Ryoji Tominaga, Numazu (JP); Kentaro Sato, Numazu (JP); Ryo Shiraki, Numazu (JP)

(73) Assignee: SHIBAURA MACHINE CO., LTD., Tokyo (JP)

( * ) Notice: Subject to any disclaimer, the term of this patent is extended or adjusted under 35 U.S.C. 154(b) by 0 days.

(21) Appl. No.: 16/841,802

(22) Filed: Apr. 7, 2020

(65) Prior Publication Data

US 2020/0230856 A1   Jul. 23, 2020

Related U.S. Application Data

(63) Continuation of application No. PCT/JP2018/038281, filed on Oct. 15, 2018.

(30) Foreign Application Priority Data

Oct. 17, 2017   (JP) .................................. 2017-201156

(51) Int. Cl.
*B29C 45/76*   (2006.01)
*B29C 45/12*   (2006.01)
(Continued)

(52) U.S. Cl.
CPC .............. *B29C 45/76* (2013.01); *B29C 45/12* (2013.01); *B29C 45/1774* (2013.01); *B29C 45/64* (2013.01); *B29C 2045/7606* (2013.01)

(58) Field of Classification Search
CPC ...... B29C 45/76; B29C 45/12; B29C 45/1774
See application file for complete search history.

(56) References Cited

U.S. PATENT DOCUMENTS 5,470,218 A * 11/1995 Hillman ................ B29C 45/768
                                                     264/40.6
7,421,309 B2 * 9/2008 Nishizawa .............. B29C 45/76
                                                     700/200
(Continued)

FOREIGN PATENT DOCUMENTS

CN        1826215       8/2006
CN      102473011       5/2012
(Continued)

OTHER PUBLICATIONS

Machine translation of JP2008155512A (Year: 2008).*
(Continued)

*Primary Examiner* — Jacob T Minskey
*Assistant Examiner* — Wayne K. Swier
(74) *Attorney, Agent, or Firm* — DLA Piper LLP (US)

(57) ABSTRACT

An injection molding machine includes: a controller configured to instruct an operation indicated by first or second operation information associated with at least either first or second image information displayed on a display, or to execute processing by a system program, wherein the first and second operation information is information about an injection molding operation according to a first or second production condition, and operation information about first and second molds or operation information about a mold clamping mechanism from beginning to completion of the injection molding operation, the display displays a plurality of operating points indicating positions of the first mold, the second mold or the mold clamping mechanism relative to time or process from the beginning of the injection molding operation, and line segments connecting the plurality of operating points, and the first and second image information are displayed on the operating points.

7 Claims, 7 Drawing Sheets

(51) Int. Cl.
*B29C 45/17* (2006.01)
*B29C 45/64* (2006.01)

(56) References Cited

U.S. PATENT DOCUMENTS

| | | | |
|---|---|---|---|
| 2004/0083016 A1* | 4/2004 | Fischer | G06Q 30/0601 |
| | | | 700/200 |
| 2004/0258787 A1* | 12/2004 | Olaru | B29C 45/76 |
| | | | 425/170 |
| 2007/0200839 A1* | 8/2007 | Sampsell | G09G 3/20 |
| | | | 345/204 |
| 2008/0031992 A1* | 2/2008 | Matsuo | B29C 45/762 |
| | | | 425/155 |
| 2010/0138031 A1 | 6/2010 | Friedrich | |
| 2010/0332017 A1 | 12/2010 | Heinz | |
| 2013/0041480 A1* | 2/2013 | Muller | G05B 19/409 |
| | | | 700/23 |
| 2013/0142899 A1* | 6/2013 | Murata | B29C 45/7653 |
| | | | 425/150 |
| 2015/0086667 A1 | 3/2015 | Grimm | |
| 2016/0082504 A1* | 3/2016 | Okochi | B22D 17/32 |
| | | | 164/150.1 |

FOREIGN PATENT DOCUMENTS

| | | |
|---|---|---|
| CN | 103038720 | 4/2013 |
| DE | 10 2010 018 475 | 11/2011 |
| EP | 1 656 245 | 5/2006 |
| JP | H06-210694 | 8/1994 |
| JP | 2000289075 A * | 10/2000 |
| JP | 2003-084975 | 3/2003 |
| JP | 2003084975 A * | 3/2003 |
| JP | 2007-500089 | 1/2007 |
| JP | 2007-098810 | 4/2007 |
| JP | 2008-036976 | 2/2008 |
| JP | 2008155512 A * | 7/2008 |
| JP | 2013-530438 | 7/2013 |
| JP | 2014-019039 | 3/2014 |
| JP | 2017-138707 | 8/2017 |

OTHER PUBLICATIONS

LanGeek: Kind vs. Type; https://langeek.co/en/grammar/course/1287/kind-vs-type (Year: 2020).*
Machine translation JP2000289075A (Year: 2000).*
Machine translation JP2003084975A (Year: 2003).*
International Preliminary Report on Patentability in PCT/JP2018/038281 dated Apr. 21, 2020.
International Search Report in PCT/JP2018/038281 dated Dec. 25, 2018.
Written Opinion in PCT/JP2018/038281 dated Dec. 25, 2018.
Japanese Office Action in JP Application No. 2017-201156, dated Sep. 14, 2018.
Chinese Office Action in CN Application No. 201880067996.4, dated May 19, 2021.
Chinese Office Action in CN Application No. 201880067996.4, dated Nov. 15, 2021.
German Office Action in DE Application No. 11 2018 004 571.4.4, dated Jan. 12, 2023.

* cited by examiner

| OPERATIONS | ICONS | OPERATIONS | ICONS |
|---|---|---|---|
| RETRACT NOZZLE | | MOLD HEATER SHIFT | |
| CALL NEXT MEMORY | | MOLD HEATER OFF | |
| AUTO PURGE | | ACTIVATE TEMPERATURE CONTROLLER | |
| BARREL HEATER SHIFT | | STOP TEMPERATURE CONTROLLER | |
| BARREL HEATER OFF | | CHANGE HOPPER | |
| UNLOAD MOLD | | START SUPPLYING RAW MATERIAL | |
| LOAD NEXT MOLD | | STOP SUPPLYING RAW MATERIAL | |
| CHANGE MOLD | | CONFIRM BEFORE EXECUTION | |
| MOLD HEATER ON | | CUSTOM OPERATION | |

FIG. 2

INJECTION MOLDING MACHINE

CROSS REFERENCE TO RELATED APPLICATIONS

This application is a continuation of U.S. National Stage Application of International Application No. PCT/JP2018/038281 filed Oct. 15, 2018, which claims priority from Japanese Patent Application No. 2017-201156 filed Oct. 17, 2017. The entirety of all the above-listed applications are incorporated herein by reference.

BACKGROUND OF THE INVENTION

Field of the Invention

An embodiment of the present invention relates to an injection molding machine.

Background Art

An injection molding machine molds a resin by pouring a molten resin into a cavity between a plurality of molds clamped together. An injection molding machine may be required to continuously produce different products by changing molds and production conditions. In such a case, changes in the settings of the molds and production conditions are made by an operation of an operator. That is, the operator sets conditions for a certain injection molding operation through a manipulation unit of the injection molding machine, and, after executing the injection molding operation, the operator resets the conditions for the next injection molding operation.

In addition, when executing the next injection molding operation after a certain injection molding operation, it is necessary to perform a preparatory operation (a so-called setup process) such as changing molds, purging a barrel, and changing resin material. Also in such a setup process, the operator executes operations through the manipulation unit of the injection molding machine.

For example, the setup process includes operations such as unloading molds, changing molds, loading molds, purging the barrel, and changing resin material. The operator needed to manipulate the injection molding machine for each of these operations.

CITATION LIST

Patent Literatures

[Patent Literature 1] National Publication of International Patent Application No. 2013-530438
[Patent Literature 2] Japanese Patent Application Laid-Open No. 2007-098810
[Patent Literature 3] Japanese Patent Application Laid-Open No. 2008-036976

SUMMARY OF THE INVENTION

However, in the case where the operator manipulates the injection molding machine for the injection molding operation and the respective operations in the setup process, time and effort are required to set the injection molding operation and the setup process. Moreover, if the operator is absent when the injection molding operation is completed, the next injection molding operation will not be started and the operation will be delayed. Furthermore, if the order of the respective operations in the setup process is incorrect, the molds and the injection molding machine may be damaged. Therefore, skilled knowledge and expertise are required for the setup process.

The present invention was made to solve the above-mentioned problems, and an object of the invention is to provide an injection molding machine capable of easily executing settings of an injection molding operation, and a setup process in a short time.

An injection molding machine according to the present embodiment includes: a mold clamping mechanism configured to perform mold clamping or mold opening by moving at least one of a first mold and a second mold; an injection device configured to inject a resin into a cavity between the clamped first mold and second mold; a storage configured to store first and second operation information indicating an operation of the first or second mold, an operation of the mold clamping mechanism, an operation of the injection device or processing by a system program, first image information associated with the first operation information, and second image information associated with the second operation information; a display which is configured to display the first and second image information, and displays at least one of the first and second image information at a position set by an operator; and a controller configured to instruct an operation indicated by the first or second operation information associated with at least either the first or second image information displayed on the display, or to execute processing by the system program, wherein the first and second operation information is information about an injection molding operation according to a first or second production condition, and operation information about the first and second molds or operation information about the mold clamping mechanism from beginning to completion of the injection molding operation, the display displays a plurality of operating points indicating positions of the first mold, the second mold or the mold clamping mechanism relative to time or process from the beginning of the injection molding operation, and line segments connecting the plurality of operating points, and the first and second image information are displayed on the operating points.

BRIEF DESCRIPTION OF THE DRAWINGS

FIG. 2 is a diagram illustrating an example of operation information and icons of a setup process.

DETAILED DESCRIPTION OF THE INVENTION

Hereinafter, embodiments of the present invention will be described with reference to the drawings. The present embodiments do not limit the present invention The drawings are schematic or conceptual, and the proportions of parts are not necessarily the same as the actual proportions. In the description and the drawings, the same components as those described above with the drawings are labeled by the same reference signs, and the detailed description will omitted as appropriate.

First Embodiment

Figure 1:
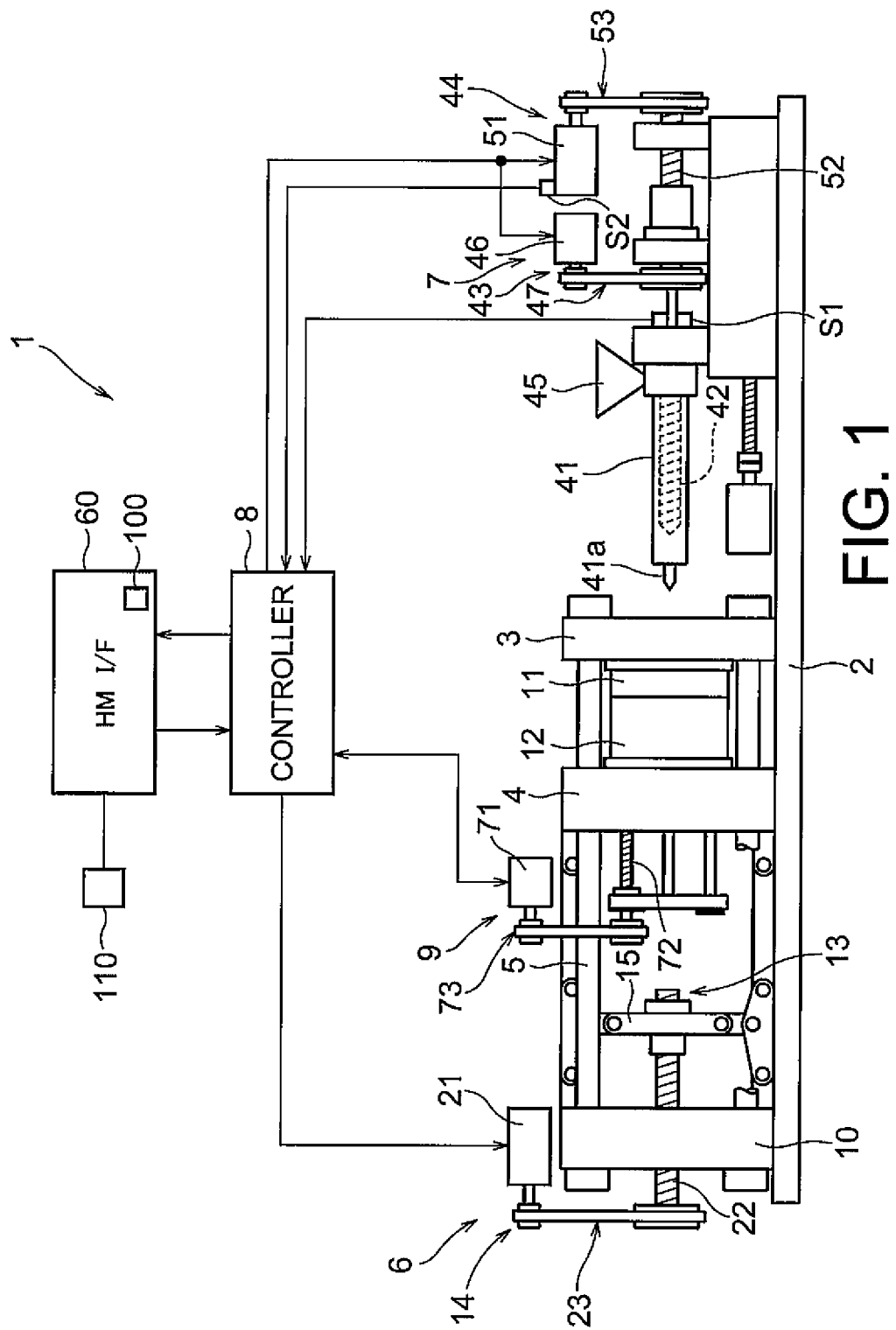
FIG. 1 is a block diagram illustrating a configuration example of an injection molding machine according to a first embodiment.

FIG. 1 is a block diagram illustrating a configuration example of an injection molding machine 1 according to the first embodiment. The injection molding machine 1 is a machine capable of repeatedly executing a series of injection molding operations, and, for example, repeats the operation of molding a molded product one time as a cyclic operation. The time of executing a series of cyclic operations is called a cycle time.

The injection molding machine 1 includes a frame 2, a stationary platen 3, a movable platen 4, a tie bar 5, a mold clamping drive mechanism 6, an injection device 7, a controller 8, an ejection mechanism 9, a human-machine interface 60, a storage 110, an injection pressure sensor S1, and a screw position sensor S2.

The frame 2 is a base of the injection molding machine 1. The stationary platen 3 is fixed on the frame 2. A stationary mold 11 as a first mold is attached to the stationary platen 3. One end of the tie bar 5 is fixed to the stationary platen 3, and another end is fixed to a support platen 10. The tie bar 5 extends from the stationary platen 3 via the movable platen 4 to the support platen 10

The movable platen 4 is mounted on a linear guide (not shown) provided on the frame 2.

The movable platen 4 is guided by the tie bar 5 or the linear guide, and can move closer to or away from the stationary platen 3. A movable mold 12 as a second mold is attached to the movable platen 4. The movable mold 12 faces the stationary mold 11, approaches the stationary mold 11 together with the movable platen 4, and is combined with the stationary mold 11. A space corresponding to the shape of a product is formed between the movable mold 12 and the stationary mold 11 by bringing the movable mold 12 and the stationary mold 11 into alignment and contact with each other.

The mold clamping drive mechanism 6 includes a toggle mechanism 13, and a toggle mechanism driver 14. The toggle mechanism driver 14 includes a mold clamping servomotor 21, a ball screw 22 and a transmission mechanism 23 to drive the toggle mechanism 13. A cross-head 15 is attached to the tip of the ball screw 22. As the ball screw 22 rotates, the cross-head 15 approaches the movable platen 4 or moves away from the movable platen 4. The transmission mechanism 23 transmits a rotation of the mold clamping servomotor 21 to the ball screw 22 to move the cross-head 15.

When the toggle mechanism driver 14 moves the cross-head 15, the toggle mechanism 13 is actuated. For example, when the cross-head 15 moves toward the movable platen 4, the movable platen 4 moves toward the stationary platen 3, and clamping of the molds 11, 12 is performed. Conversely, when the cross-head 15 moves in a direction away from the movable platen 4, the movable platen 4 moves in a direction away from the stationary platen 3, and mold opening of the molds 11, 12 is performed.

The ejection mechanism 9 includes an ejection servomotor 71, a ball screw 72 and a transmission mechanism 73 to remove a molded product from the movable mold 12. A tip of the ball screw 72 penetrates an inner surface of the movable mold 12. As the ball screw 72 rotates, the ball screw 72 pushes out the product adhering to the inner surface of the moving mold 12. The transmission mechanism 73 transmits a rotation of the ejection servomotor 71 to the ball screw 72 and moves the ball screw 72 in a left-right direction of FIG. 1.

The injection device 7 includes a heated barrel (band heater) 41, a screw 42, a measurement driver 43, and an injection driver 44. The heated barrel 41 includes a nozzle 41a for injecting a molten resin into the cavity of the clamped molds. The heated barrel 41 stores the resin from a hopper 45 while heating and melting the resin, and injects the molten resin from the nozzle. The screw 42 is movable while rotating or without rotating in the heated barrel 41. In a measurement process, the screw 42 rotates, and an injection amount of the molten resin injected from the barrel 41 is measured and determined by the rotation amount (moved distance) of the screw 42. In the injection process, the screw 42 moves without rotating, and injects the molten resin from the nozzle.

The measurement driver 43 has a measurement servomotor 46, and a transmission mechanism 47 for transmitting a rotation of the metering servomotor 46 to the screw 42. When the measurement servomotor 46 is driven and the screw 42 is rotated in the heated barrel 41, the resin is introduced into the heated barrel 41 from the hopper 45. The introduced resin is fed to the tip side of the heated barrel 41 while being heated and kneaded. The resin is melted and stored in a tip portion of the heated barrel 41. The molten resin is injected from the barrel 41 by moving the screw 42 in a direction opposite to the direction at the time of measurement. At this time, the screw 42 moves without rotating and pushes the molten resin out through the nozzle. In the present embodiment, the molten resin is used as a molding material, but the molding material is not limited to the molten resin and may be metal, glass, rubber, a carbonized compound including carbon fiber, or the like.

The injection driver 44 includes an injection servomotor 51, a ball screw 52, and a transmission mechanism 53. As the ball screw 52 rotates, the screw 42 moves in the left-right direction of FIG. 1 in the heated barrel 41. The transmission mechanism 53 transmits a rotation of the injection servomotor 51 to the ball screw 52. Thus, as the injection servomotor 51 rotates, the screw 42 moves. By pushing the molten resin stored in the tip portion of the heated barrel 41 out through the nozzle 41a by the screw 42, the molten resin is injected from the nozzle 41a.

The injection pressure sensor S1 detects a filling pressure when filling the molten resin into the mold from the barrel 41, and a hold pressure in a pressure holding process. In the injection process, the injection pressure sensor S1 detects an injection pressure of injecting the molten resin from the barrel 41 into the mold. In the pressure holding process, the injection pressure sensor S1 detects a hold pressure of the molten resin after changing the hold pressure from speed control to pressure control.

The screw position sensor S2 detects the position of the screw 42. Since the screw 42 moves with the rotation of the injection servomotor 51, the screw position sensor S2 may detect the position of the screw 42 from the rotational speed and the angular position of the injection servomotor 51. By detecting the position of the screw 42 at predetermined control cycles, the velocity and acceleration of the screw 42 can be found.

The human-machine interface (HM I/F) 60 displays various pieces of information related to the injection molding machine 1. The HM I/F 60 may include, for example, a display and a keyboard, or may be a touch-panel display. A user can input settings, such as instructions concerning operations of the injection molding machine 1, through the HM I/F 60. For example, in injection molding, a product is molded by an injection process of injecting a molten resin into a mold, and a pressure holding process of controlling the hold pressure of the molten resin in the mold.

The controller 8 monitors sensor information received from various sensors (not shown) during the injection process, and controls the injection device 7 based on the sensor information. Moreover, the controller 8 controls the screw 42 in accordance with the setting value set through the HM I/F 60. Furthermore, the controller 8 displays necessary data on the display 100.

The storage 110 stores a plurality of pieces of operation information on the injection molding machine 1. The operation information is information indicating operations of the molds 11, 12, the mold clamping drive mechanism 6, or the injection device 7. For example, in the present embodiment, the operation information is information on a setup process of preparing between an injection molding operation under a certain production condition and an injection molding operation under the next production condition. Operations in the setup process include an operation of retracting the nozzle 41a, an operation of purging the barrel 41, an operation of unloading the molds 11, 12, an operation of changing the molds 11, 12, an operation of loading the molds 11, 12, an operation of changing resin material, and changing of the production condition settings, which are executed after completion of a certain injection molding operation.

Each operation in the setup process is associated with an icon as image information, and is displayed as the icon on the display 100. An icon is a symbol that plainly indicates the content of corresponding operation information. Detailed examples of icons will be described later with reference to FIG. 2.

The display 100 displays the icons associated with the respective operations in the setup process. The operator can intuitively understand the respective operations in the setup process by referring to the icons on the display 100. The operator selects icons and arranges the icons in arbitrary order by "drag and drop". Hence, the display 100 can display the icons arranged in arbitrary order.

The controller 8 automatically executes operations related to the icons in order of arrangement of the icons displayed on the display 100. For example, as shown in an icon arrangement area A2 of FIG. 3, the controller 8 instructs a sequencer (not shown) to execute the operation of retracting the nozzle 41a and the operation of purging the barrel 41, or automatically executes "confirmation by the operator", in this order. The icons also include processing by a system program, which is executed by the controller 8. Here, a program that is executed by the controller 8 is called the "system program". For example, the icons include a process of retrieving, from the storage 110, information necessary for changing settings, such as changing of the operation condition from a certain production condition to the next production conditions (processing by the system program). In the icon arrangement area A2, a single icon may be displayed on a position set by the operator. In this case, an operation instruction or processing associated with the single icon displayed in the icon arrangement area A2 is executed.

In the case where the same product is repeatedly molded, the production condition does not need to be changed, and the injection molding machine 1 can automatically and repeatedly mold the product. On the other hand, when molding a different product, the setup process is required to change the condition for the injection molding operation and the mold.

FIG. 2 is a diagram illustrating an example of operation information and icons of the setup process. Each of operations and icons of the setup process are stored as data in the storage 110. For example, "RETRACT NOZZLE" indicates retraction of the nozzle 41a and the heated barrel 41 by a predetermined distance. "CALL NEXT MEMORY" indicates retrieval of operation conditions of the mold clamping drive mechanism 6 and the injection device 7 for the next injection molding operation. That is, the "CALL NEXT MEMORY" is not a sequence operation by the sequencer, but indicates processing by a system program of retrieving, from the storage 110, information necessary for changing settings, such as changing of operation conditions from a certain production condition to the next production condition. Further, the system program is a program that is executed by the controller 8, and is different from a system program that is executed by the sequencer. "AUTO PURGE" indicates execution of purging in the barrel 41. "BARREL HEATER SHIFT" indicates decreasing (increasing) the temperature of the barrel 41 to a predetermined temperature. "BARREL HEATER OFF" indicates turning off the power supply to the heater of the barrel 41. "UNLOAD MOLD" means unloading the molds 11, 12 from the mold clamping drive mechanism 6, and "LOAD MOLD" means loading the molds 11, 12 to the mold clamping drive mechanism 6. "CHANGE MOLD" means changing the unloaded molds 11, 12. "MOLD HEATER ON/OFF" is turning on or off the heater of the molds 11, 12. "MOLD HEATER SHIFT" means changing the heater temperature of the molds 11, 12 from a certain set temperature to another set temperature. "ACTIVATE TEMPERATURE CONTROLLER/STOP TEMPERATURE CONTROLLER" means activating or stopping a mold temperature controller. "HOPPER CHANGE" means changing the resin material in the hopper 45. "START SUPPLYING RAW MATERIAL/ STOP SUPPLYING RAW MATERIAL" means starting the supply of a resin material to the hopper 45, or stopping the supply of the resin material to the hopper 45. "CONFIRM BEFORE EXECUTION" means confirmation by the operator is required before executing the next operation. In addition, as shown in FIG. 2, the information and icon of each operation necessary for the next setup process are associated with each other and stored in in the storage 110.

The operations in the setup process include an operation that is executed by a sequencer such as a PLC (Programmable Logic Controller), and an operation (processing) that is executed by a CPU according to a system program instead of the sequencer. For example, "RETRACT NOZZLE", "BARREL HEATER OFF, "MOLD HEATER OFF", etc. are sequence operations to be executed by the sequencer. On the other hand, "CALL NEXT MEMORY", "BARREL HEATER SHIFT", "MOLD HEATER SHIFT", etc. are not sequence operations, and are processing by the system program. Thus, in the present embodiment, each operation or processing of the setup process is represented by an icon regardless of whether the operation or processing is a sequences operation or processing by the system program.

Figure 3:
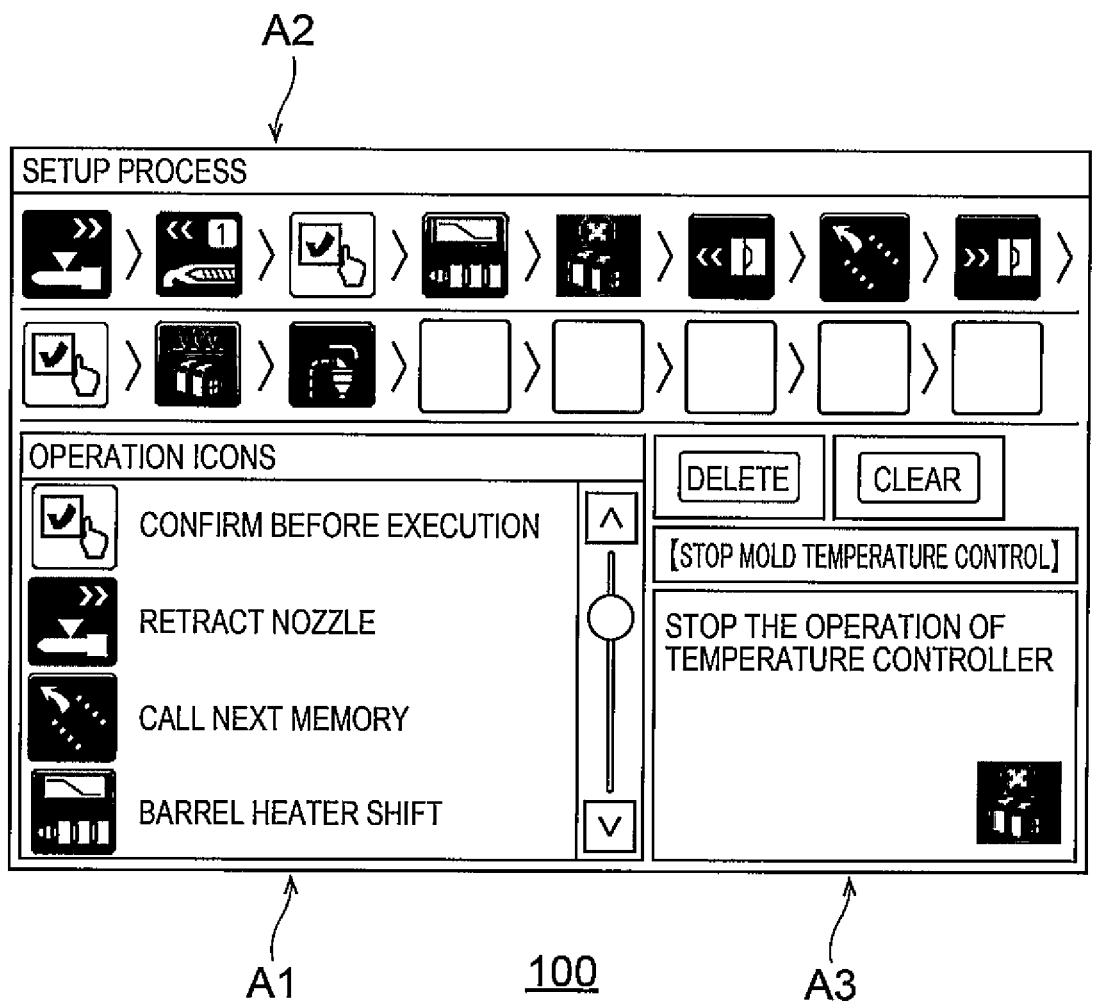
FIG. 3 is a diagram illustrating an example of icons and an arrangement of the icons displayed on a display.

FIG. 3 is a diagram illustrating an example of icons and an arrangement of the icons displayed on the display 100. The display 100 displays a list of the icons of the respective operations in the setup process in an icon display area A1 to allow the operator to select the icons. The operator can select an icon from the list of the icons displayed in the icon display area A1 with a pointer or a touch panel on the display 100, and drag the icon.

The icons are arranged in order of operations in the setup process in the icon arrangement area A2. The operator moves an icon selected in the icon display area A1 to the icon arrangement area A2, and drops the icon on an arbitrary position. Thus, the icons can be arranged in order of operations in the setup process in the icon arrangement area A2. The icons in the icon arrangement area A2 can be arbitrarily moved, inserted, or deleted by "drag and drop".

For example, in the setup process shown in FIG. 3, the nozzle 41a is retracted after a certain injection molding operation. The operator selects the first icon related to retraction of the nozzle 41a as the first operation information, and places the first icon on the first frame in the icon arrangement area A2 by "drag and drop".

Next, the barrel 41 is purged under a condition 1. The operator selects the second icon related to purging of the barrel 41 as the second operation information, and places the second icon on the second frame in the icon arrangement area A2 by "drag and drop". When the second icon is placed, a pop-up window (not shown) for selecting a purge condition is opened. The operator inputs a purge condition in the pop-up window.

Similarly, the operator selects relevant icons in order of operations in the setup process, and places the icons on the frames in the icon arrangement area A2 by "drag and drop". For example, subsequently the icon indicating confirmation by the operator, the icon indicating shifting (decreasing) the temperature of the barrel heater, the icon indicating stopping the operation of the mold temperature controller, the icon indicating unloading of the mold, the icon indicating loading of an operation condition and a program of the next injection molding operation, the icon indicating loading of the next mold, the icon indicating confirmation by the operator, the icon indicating activation of the mold temperature controller, and the icon indicating start of supply of a resin material are placed in this order. Thus, the setup process between a certain injection molding operation and the next injection molding operation is displayed by a series of operation icons. The number of kinds of icons to be displayed in the icon display area A1 and the number of icons to be arranged in the icon arrangement area A2 are not limited. The first to nth icons (n is an integer of not less than 1) may be displayed in the icon display area A1 or may be arranged in the icon arrangement area A2.

When the operator instructs execution (presses an execution button, for example), the controller 8 automatically instructs operations or executes processing related to the icons in order of arrangement of the icons displayed on the display 100. Further, a current operation display area A3 indicates the operation being currently executed by the injection molding machine 1. For example, FIG. 3 shows a situation in which the injection molding machine 1 stops the operation of the mold temperature controller.

After executing the setup process, the next injection molding operation is started.

The created data for the setup process may be stored in the storage 110 in association with a symbol or a number specifying the molds 11, 12, or a symbol or a number specifying a product to be molded. Hence, when using the same molds 11, 12 or when molding the same product, the injection molding machine 1 can retrieve the data for the past setup process from the storage 110 and execute the process. Moreover, in the icon arrangement area A2, the icons are arranged in order of operations corresponding to the process. However, in the icon arrangement area A2, the icons and operation information corresponding to the icons may be arranged side by side, and displayed vertically in order of operations as a list.

Figure 4:
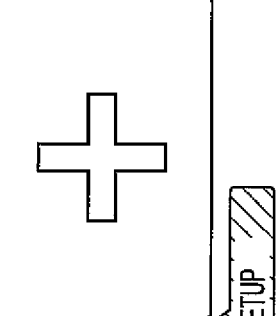
FIG. 4 is a diagram illustrating a displayed screen example on the display, showing a production plan of the injection molding machine.

FIG. 4 is a diagram illustrating a displayed screen example on the display 100, showing a production plan of the injection molding machine 1. The production plan is a production plan for a predetermined period (for example, one day).

The injection molding machine 1 is scheduled to execute, for example, the first to third production conditions 1 to 3 and mold three kinds of products. In this case, a setup process is required between an injection molding operation according to the first production condition and an injection molding operation according to the second production condition. That is, when changing from the first production condition to the second production condition, a first setup process is executed to change the molds 11, 12 and/or resin material or the like. When changing from the second production condition to the third production condition, a second setup process is executed to change the molds 11, 12 and/or the resin material or the like.

The injection molding machine 1 according to the present embodiment can arrange such a plurality of production conditions and a setup process between the production conditions as a series of operations. When the operator instructs execution, the injection molding machine 1 sequentially executes a plurality of production conditions and setup processes in order of arrangement. For example, in the example shown in FIG. 4, the injection molding machine 1 executes an injection molding operation according to the first production condition. When the injection molding operation according to the first production condition is completed, the injection molding machine 1 executes the first setup process, and thereafter executes an injection molding operation according to the second production condition. When the injection molding operation according to the second production condition is completed, the injection molding machine 1 executes the second setup process, and thereafter executes an injection molding operation according to the third production condition. When the injection molding operation according to the third production condition is completed, a series of production plans are completed. The injection molding machine 1 according to the present embodiment can automatically and successively execute such a series of production plans.

The created production plans may be stored in the storage 110. Hence, the injection molding machine 1 can retrieve the data for the past production plans and readily reproduce the production plans.

As described above, the injection molding machine 1 according to the present embodiment can display the icons indicating the respective operations in a setup process on the display 100, and the icons can be arranged in order of operations in the setup process by the operator using "drag and drop". The controller 8 automatically instructs operations or executes processing related to the icons in order of arrangement of the icons displayed on the display 100. Hence, the operator can easily arrange and compose the operations in the setup process by just dragging and dropping the icons. Moreover, the operator can relatively freely create setup processes suitable for production conditions. Further, a series of setup processes created are automatically executed. This shortens the time of the setup processes and prevents the operator from making a mistake in the work procedure, thereby reducing damages to the molds 11, 12.

The injection molding machine 1 may store the created setup processes in the storage 110. Hence, the injection molding machine 1 can retrieve the data for the past setup processes from the storage 110 and readily reproduce the setup processes.

In the present embodiment, not only operations which are executed by the sequencer, but also processing by the system program can be displayed as icons and be selected. Hence, the operator can compose sequence operations and processing by the system program as a series of setup processes on the display 100 without distinguishing the sequence operations and the processing from each other. Moreover, the operator can freely compose a series of setup processes by just arranging the icons. Furthermore, if an arrangement pattern of the icons arranged once is stored in the storage 110 and made into a database, the operator can readily retrieve the data for the arrangement pattern in the past setup process from the storage 110 and reuse the arrangement pattern.

In the case where individual operations and processing, such as nozzle retraction and mold change which are executed by the sequencer and the system program, are preliminarily designed by the manufacturer of the injection molding machine 1, in order to execute a series of setup processes including a plurality of operations, the operator (user) needs to continuously manipulate the injection molding machine 1 for each of the individual operations. For example, the operator needs to press a button for mold change after pressing a button for nozzle retraction. Furthermore, in this case, the mold change operation is a predetermined operation, and the mold change operation itself cannot be flexibly changed.

On the contrary, according to the present embodiment, the individual operations and processing such as nozzle retraction and mold change which are executed by the sequencer and the system program are displayed as icons, and it is possible to easily compose setup processes by arranging the icons. After instructing execution of a series of setup processes, the operator basically does not need to manipulate the injection molding machine 1 until the setup processes are completed. Also, an individual operation such as mold change may be subdivided into a plurality of operations and displayed as icons. Hence, the operator can flexibly change the mold change operation itself. That is, according to the present embodiment, the user can also easily change the contents of predetermined sequence operations by just changing the arrangement of the icons.

Second Embodiment

Figure 5:
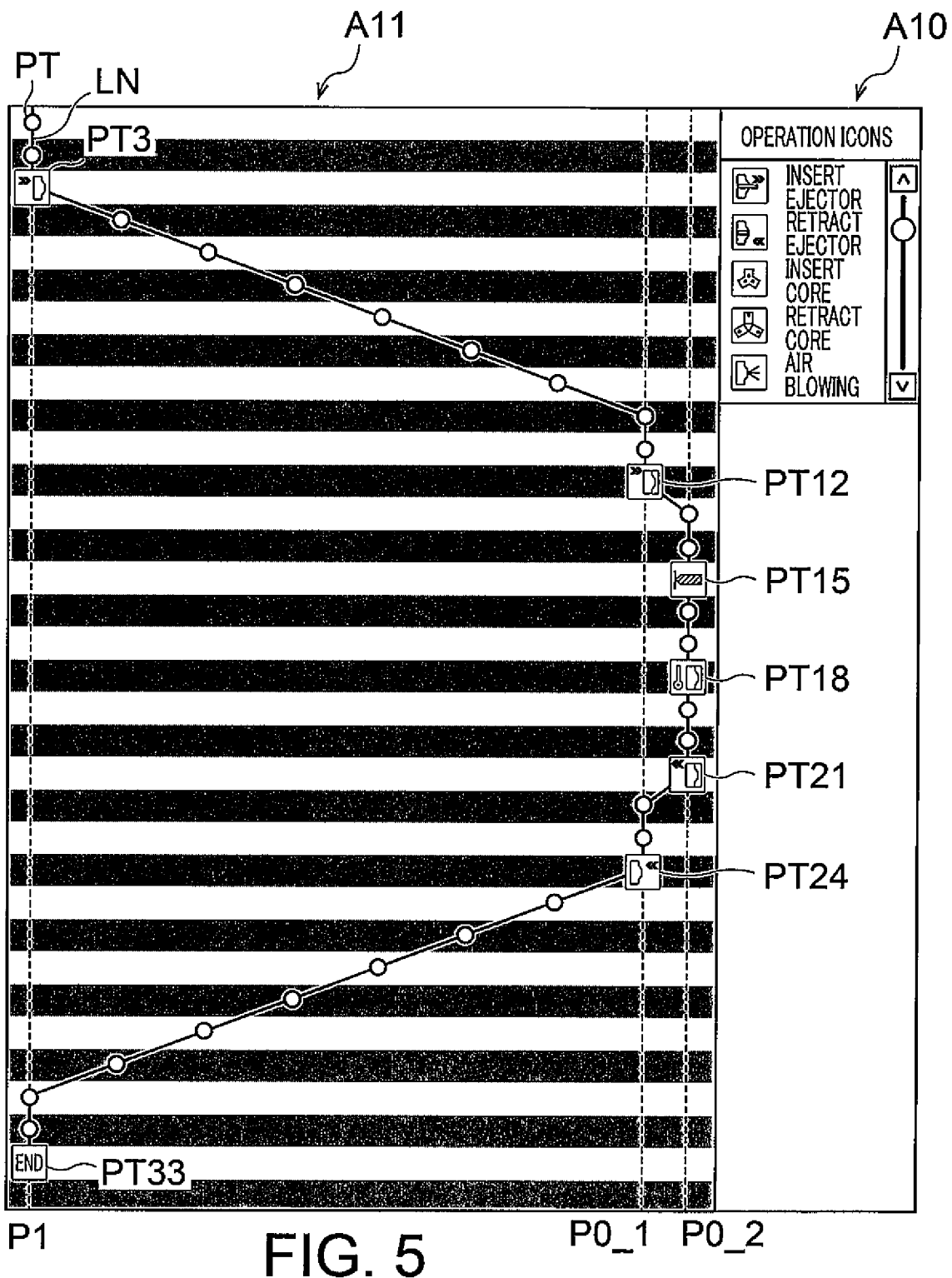
FIG. 5 is a diagram illustrating an example of icons of a production process and an arrangement of the icons displayed on the display according to a second embodiment.

FIG. 5 is a diagram illustrating an example of icons and an arrangement of the icons displayed on the display 100 according to the second embodiment. The injection molding machine 1 according to the second embodiment can arrange the icons of the respective operations in a production process by "drag and drop".

A10 in FIG. 5 is an icon display area showing the icons corresponding to the respective operations in a production process.

A11 is a production flow display area showing a flow of operations of a series of production processes.

The icon display area A10 displays a list of the icons of the respective operations in the production processes so as to allow the operator to select the icons. The operator can select an icon from the list of the icons displayed in the production flow display area A11 and drag the icon with the pointer or the touch panel on the display 100.

In the production flow display area A11, the horizontal axis represents the position of the movable platen (die plate) 4 or the position of the movable mold 12. The vertical axis represents the time or process. The horizontal and vertical axes may not have to indicate the correct position and the correct time. For example, as the position of the movable platen 4, positions P0_1 and P0_2 are substantially the same position when the molds 11, 12 are in a clamped state.

However, at the position P0_1, although the molds 11, 12 are clamped, the molds 11, 12 are in an unlocked state. At the position P0_2, the molds 11, 12 are in a locked-up state. Thus, the horizontal axis displays the concept including the position of the movable platen 4 and the state of the molds 11, 12. For example, the vertical axis displays the respective operations in the production process arranged in time, and does not necessarily display the operations in the same unit (for example, seconds, minutes, hours). Therefore, the time intervals of the respective operating points PT in the production flow display area A11 of FIG. 5 may be different from each other. The flow of the production process is represented by a plurality of operating points PT, a plurality of line segments LN connecting two adjacent operating points PT, and icons corresponding to the operations performed at the respective operating points PT. The operating points PT are points that indicate the positions of the molds 11, 12 or the movable platen 4 relative to the time or process from the beginning of the injection molding operation. Also, the operating points PT indicate time points or positions at which the respective operations in one or more production processes can be executed, and are points on which icons can be placed. It is possible to place the icons on the operating points PT in the flow of the production processes, but not on the line segments LN. A chart made up of the operating points PT and line segments LN which are the basis of the flow of production process is stored in advance in the storage 110. The storage 110 stores the charts of a plurality of different production processes according to production conditions. The operator selects a production process according to the kind of a product, and the display 100 displays the chart of the selected production process.

Moreover, the operator can arrange icons on the operating points PT in order of operations in the production process. The operator moves an icon selected in the icon display area A10 to the production flow display area A11, and drops the icon at the position of an arbitrary operating point PT. Hence, the icons can be arranged in order of operations in the production process in the production flow display area A11. The icons in the production flow display area A11 can be arbitrarily moved, inserted, or deleted by "drag and drop".

Further, a fixed icon (fixed image information) placed on a predetermined operating point in advance cannot be selected by the operator, and is placed in advance on the predetermined operating point PT. Such existing fixed icons are stored together with the chart in the storage 110 in advance.

For example, in FIG. 5, on an operating point PT3, the movable platen 4 starts moving, and clamping of the molds 11, 12 is started. Accordingly, an icon indicating the start of mold clamping is set on the operating point PT3. At an operating point PT12, mold clamping is completed and locking-up is started. Accordingly, an icon indicating the start of locking-up is set on the operating point PT12. At an operating point PT15, injection of resin is started. Accordingly, an icon indicating the start of injection is set on the operating point PT15. At an operating point PT18, cooling of the molds 11, 12 is started. Accordingly, an icon indicating the start of cooling is set on the operating point PT18. At an operating point PT21, unlocking of the molds 11, 12 is started. Accordingly, an icon indicating the start of unlocking is set on the operating point PT21. At an operating point PT24, opening of the molds 11, 12 is started. Accordingly, an icon indicating the start of opening of molds is set on the operating point PT24. Thereafter, at an operating point PT33, a series of production processes are completed. The icons on the operating points PT3, PT12, PT15, PT18, PT21, PT24 and PT33 may be selectively placed by the operator, or may be fixed icons set in advance. The operator cannot move the fixed icons.

Hereinafter, the present embodiment will be described by supposing that the icons on the operating points shown in FIG. 5 are fixed icons. In this case, when a chart is retrieved from the storage 110, the chart and the fixed icons shown in FIG. 5 are displayed in the production flow display area A11. The operator can further add other icons.

Figure 6:
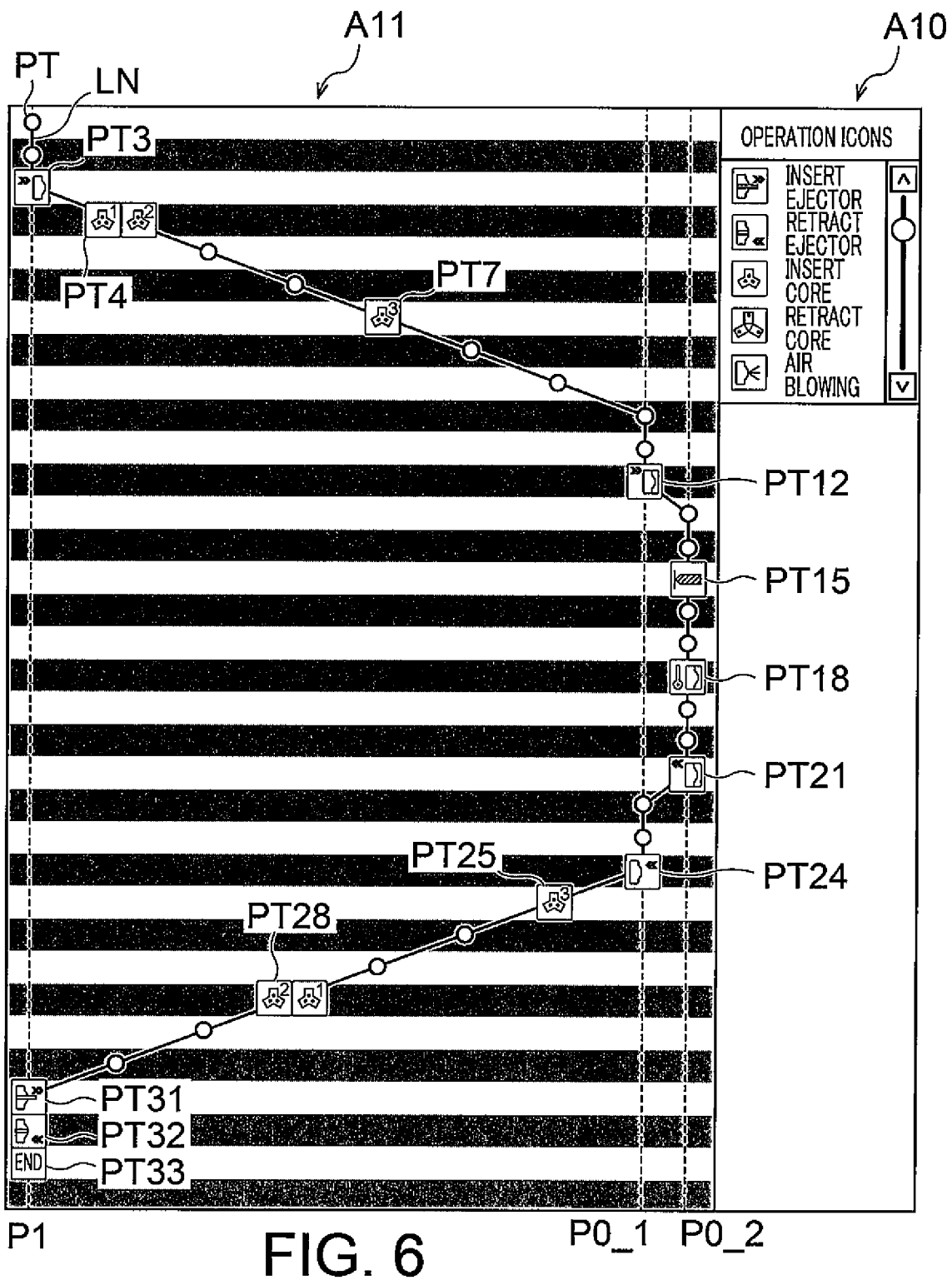
FIG. 6 is a diagram illustrating a flow of the production process after the addition of icons by an operator has been completed.

FIG. 6 is a diagram illustrating a flow of the production process after the addition of icons by the operator has been completed. As described above, the operator places an icon in the icon display area A10 on an arbitrary operating point PT in the production flow display area A11 by "drag and drop".

For example, on an operating point PT4, two icons "INSERT CORE 1" and "INSERT CORE 2" are placed side by side. This means that "INSERT CORE 1" and "INSERT CORE 2" are simultaneously executed. Thus, a plurality of icons corresponding to operations to be executed simultaneously can be displayed side by side for the same time or the same process on the display 100. Further "INSERT CORE 1" corresponds to the first operation information, and the icon corresponds to the first image information. "INSERT CORE 2" corresponds to the second operation information, and the icon corresponds to the second image information. A core is, for example, a part of a mold used for creating a product having an empty space inside, such as a hollow shape or a pipe shape. The mold may have a plurality of cores which are inserted into a cavity.

In the second embodiment, the molds 11, 12 have three cores. The numerical values in the "INSERT CORE" icons shown in FIG. 6 represent the core number of the three cores, namely the first to third cores. By "INSERT CORE 1", the first core is inserted into the cavity in the molds 11, 12. At the same time, by "INSERT CORE 2", the second core is inserted into the cavity in the molds 11, 12. The first and second cores can be simultaneously inserted.

Figure 7A:
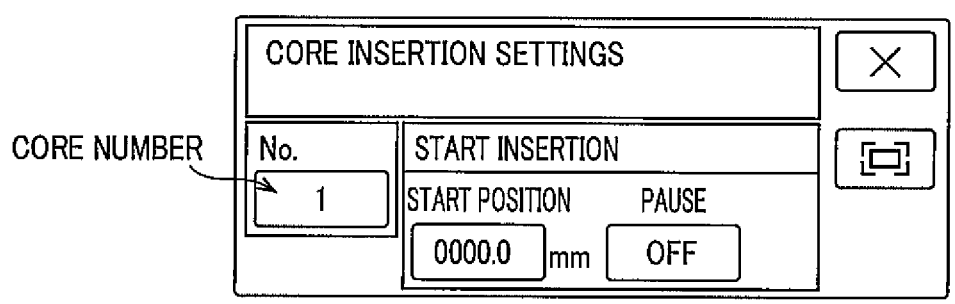
FIG. 7 is a diagram illustrating an example of a core insertion and core retraction pop-up window.

When the "INSERT CORE" icon is placed on an operating point by "drag and drop", the display 100 opens a pop-up window for entering the core number, the positions from the mold clamped state to the mold 12, the necessity of a pause, etc. FIG. 7A is a diagram illustrating an example of the pop-up window for core insertion. The operator selects one of the first to third core numbers. For example, in FIG. 7A, the first core is selected. The controller 8 may automatically determine a position of the mold 12 at which core insertion is started, depending on the operating point where the icon is placed. Alternatively, a position of the mold 12 at which core insertion is started may be preset. If the set position of the mold 12 and the operating point do not match, the display 100 may display an error. For the second core, settings are also made in the same manner as for the first core.

Next, on an operating point PT7, the "INSERT CORE 3" icon is placed. This means that "INSERT CORE 3" is executed. By "INSERT CORE 3", the third core is inserted into the cavity in the molds 11, 12. For the third core, settings are also made in the pop-up window in the same manner as for the first and second cores.

After mold clamping, injection and mold opening, the "RETRACT CORE 3" icon is placed on the operating point PT25. This means that "RETRACT CORE 3" is executed. By "RETRACT CORE 3", the third core is withdrawn from the cavity in the molds 11, 12.

Figure 7B:
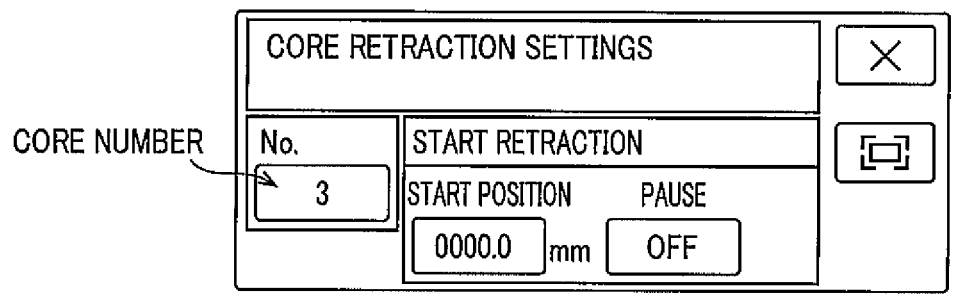

When a "RETRACT CORE" icon is placed on the operating point PT25 by "drag and drop", the display 100 opens a pop-up window for entering the core number, the positions from the mold clamped state to the mold 12, the necessity of a pause, etc. FIG. 7B is a diagram illustrating an example of the pop-up window for core retraction. The operator selects one of the first to third core numbers. For example, in FIG. 7B, the third core is selected. A position of the mold 12 at which core retraction is started may be automatically determined by the controller 8, depending on the operating point where the icon is placed. Alternatively, a position of the mold 12 at which core retraction is started may be preset. If the set position of the mold 12 and the operating point do not match, the display 100 may display an error.

Next, on an operating point PT28, two icons "RETRACT CORE 2" and "RETRACT CORE 1" are placed side by side. This means that "RETRACT CORE 2" and "RETRACT CORE 1" are simultaneously executed. By "RETRACT CORE 2", the second core is withdrawn from the cavity in the molds 11, 12. At the same time, by "RETRACT CORE 1", the first core is withdrawn from the cavity in the molds 11, 12. For the first and second cores, settings are also made in the pop-up window in the same manner as for the third core.

Next, on an operating point PT31, the "INSERT EJECTOR PIN" icon is placed. This means that the "ejector pin" pushes the product out of the mold 11, 12. The ejector pin is a pin that is pushed out of the molds 11, 12 to remove the product from the molds 11, 12.

Subsequently, on an operating point PT32, the "RETRACT EJECTOR PIN" icon is placed. This means that the "ejector pin" is retracted back into the mold 11, 12 after pushing the product out of the mold 11, 12. The "INSERT EJECTOR PIN" and "RETRACT EJECTOR PIN" icons are successive on the operating points 31 and 32, and are successive operations in time. Thus, in the case where a plurality of operations are successively executed, the icons corresponding to the plurality of operations can be displayed on a plurality of successive (adjacent) operating points in time or process on the display 100.

The icons of "INSERT CORE 1" to "INSERT CORE 3", "RETRACT CORE 1" to "RETRACT CORE 3", "INSERT EJECTOR PIN" and "RETRACT EJECTOR PIN" are selectively placed on the operating points PT4, PT7, PT25, PT28, PT31 and PT32 by the operator using "drag and drop". Consequently, a flow of a series of production processes is complete.

Further, the icons can be basically placed on arbitrary operating points PT, but obviously contradictory operations and dangerous operations are prohibited. For example, "INSERT CORE" and "RETRACT CORE" must be placed as a pair. If "RETRACT CORE" is not set for the first core despite "INSERT CORE" is set for the first core, the flow of the production process cannot be executed, and an error occurs. Furthermore, "INSERT EJECTOR PIN" cannot be set during the period of clamping.

When the injection molding machine 1 executes the production process, the operations shown by the icons placed on the operating points PT1 to PT33 are executed in this order. Consequently, the production process is executed, and the injection molding operation is executed.

For example, the injection molding operation in the production process shown in FIG. 6 is executed as follows.

First, at the operating point PT 3, mold clamping is started, and the movable platen 4 brings the mold 12 closer to the mold 11. While moving the mold 12, the first core and the second core of the molds 11, 12 are simultaneously inserted at the operating point PT4. At the operating point PT7, the third core of the molds 11, 12 is started.

Next, at the operating point PT12, the molds 11, 12 contact each other, and locking-up of the molds 11, 12 is started. After completing locking-up, a resin is injected into the cavity of the molds 11, 12 at the operating point PT15. After injection, the molds 11, 12 are cooled at the operating point PT18.

After cooling, unlocking of the molds 11, 12 is started at the operating point PT21. After completing unlocking, opening of the molds 11, 12 is started at the operating point PT24. In opening the molds, while moving the mold 12, the third core is retracted and withdrawn at the operating point PT25.

At the operating point PT28, the first core and the second core of the molds 11, 12 are simultaneously retracted and withdrawn.

Next, at the operating point PT31, the ejector pin pushes out the product. Subsequently, at the operating point PT32, the ejector pin is retracted. Consequently, a series of production processes are complete. When molding the same product repeatedly, the same production process is repeatedly executed. On the other hand, when molding another product, as described with reference to FIG. 4, production conditions are changed in the setup process, and the production process corresponding to the production condition is executed.

Further, the icons may represent not only operations related to the molds 11, 12 and the movable platen 4, but also operations of other components. For example, an icon corresponding to an "AIR BLOWING" operation to remove the resin residue adhering to the molds 11, 12 may be displayed in the icon display area A10.

The operator may selectively place the "AIR BLOWING" icon on the chart.

The chart composed of the operating points PT and the line segments LN is preset and cannot be changed by the operator. However, the operator may be allowed to change the chart. In this case, for example, the operating points PT may be increased or decreased, or the timings of mold clamping, injection, and mold opening may be changed. Furthermore, the icons fixed in advance in the chart (the icons of start locking-up, start injection, start cooling, start mold opening, etc.) cannot be changed by the operator. However, the operator may be allowed to change the timings and the positions of these icons.

Thus, in the second embodiment, the icons of the respective operations in the production process can be arranged by "drag and drop". In the first embodiment, the operation information is the information on the respective operations in the setup process, whereas in the second embodiment, the operation information is the information on the injection molding operation in a production process under a certain production condition. Moreover, operation information selectable by the operator is the operation information on the molds 11, 12 or the operation information on the mold clamping drive mechanism 6 from the beginning to the completion of the injection molding operation. The operator places the icons corresponding to the operations of the molds 11, 12 or the operation of the mold clamping drive mechanism 6 in the injection molding operation on the chart in the icon display area A11 by "drag and drop". Hence, the operator can easily compose a flow of the production process. Moreover, the operator can relatively freely create a production process suitable for a production condition. Furthermore, a created series of production processes are automatically executed. This shortens the time of the production processes and prevents the operator from making a mistake in the work procedure. The injection molding machine 1 may store the created production processes in the storage 110. Consequently, the injection molding machine 1 can retrieve the data for the past production processes from the storage 110 and readily reproduce the production processes.

In the second embodiment, not only operations which are executed by the sequencer, but also processing by the system program can be displayed as icons and be selected. Hence, the operator can compose a series of production processes from sequence operations and processing by the system program without distinguishing the sequence operations and the processing from each other on the display 100. Moreover, the operator can freely compose a series of production processes by just arranging the icons. Furthermore, if an arrangement pattern of icons which were arranged once is stored in the storage 110 and made into a database, the operator can readily retrieve the data for the arrangement pattern of the past production process from the storage 110 and reuse the arrangement pattern.

According to the present embodiment, individual operations, such as "INSERT CORE" and "RETRACT CORE", which are executed by the sequencer and the system program are displayed as icons, and a production process can be easily composed by arranging the icons. After instructing execution of a series of production processes, the operator basically does not need to manipulate the injection molding machine 1 until the production processes are completed. An individual operation, such as "INSERT CORE", may be subdivided into a plurality of operations and displayed as icons. Consequently, the operator can flexibly change an operation itself, such as "INSERT CORE". That is, according to the present embodiment, the user can easily change the contents of predetermined sequence operations by just changing the arrangement of the icons.

The second embodiment may be combined with the first embodiment. For example, after setting the conditions for the first to third production processes in FIG. 4 according to the second embodiment, the conditions for the first and second setup processes may be set according to the first embodiment. Thereafter, when the operator instructs execution, the injection molding machine 1 automatically executes the first production process, the first setup process, the second production process, the second setup process, and the third production process in this order. Consequently, the injection molding machine 1 can automatically mold a plurality of kinds of products according to production plans.

According to the first and second embodiments, the relevance and flow of the respective operations in the production processes and the setup processes are displayed on the display 100. Therefore, the operator can intuitively easily realize settings with a high degree of freedom while confirming the timings and order of the respective operations in the production processes and the setup processes. If the settings of the timings and order of the respective operations in the production processes and the setup processes are preset, the injection molding machine 1 can produce many kinds of products in small lot sizes in a short time.

While some embodiments of the present invention have been described, these embodiments are presented as examples and are not intended to limit the scope of the invention. These embodiments can be implemented in various other forms, and various omissions, substitutions and modifications can be made without departing from the gist of the invention. Similarly to being included within the scope and the gist of the invention, these embodiments and modifications thereof are included within the scope of the invention described in the claims and equivalents thereof.

The invention claimed is:

1. An injection molding machine comprising:
a mold clamping mechanism configured to perform mold clamping or mold opening by moving at least one of a first mold and a second mold;
an injection device configured to inject a resin into a cavity between the clamped first mold and second mold;
a storage configured to store:
first and second operation information each respectively indicating an operation of the first or second mold from among one or more possible operations the first or second mold is configured to perform, an operation of the mold clamping mechanism from among one or more possible operations the mold clamping mechanism is configured to perform, an operation of the injection device from among one or more possible operations the injection device is configured to perform, or processing by a system program from among one or more possible operations the system program is configured to perform,
first image information including a first icon indicating the operation indicated by the first operation information, and
second image information including a second icon indicating the operation indicated by the second operation information;
a display which is configured to display the first and second icons, and displays at least one of the first and second icons at a position set by an operator; and
a controller configured to automatically execute processing by the system program, wherein
the first and second operation information is information about a kind of an injection molding operation according to a first or second production condition, and information about a kind of an operation of the first and second molds or information about a kind of an operation of the mold clamping mechanism from beginning to completion of the injection molding operation,
the display displays a first axis representing a position of the first mold, the second mold or the mold clamping mechanism and a second axis orthogonal to the first axis representing time or process,
the display displays a plurality of operating points indicating positions of the first mold, the second mold or the mold clamping mechanism in the first axis relative to time or process in the second axis from the beginning of the injection molding operation to the completion of the injection molding operation, and line segments connecting the plurality of operating points so that the plurality of operating points and the line segments represent a flow of a series of production process from the beginning of the injection molding operation to the completion of the injection molding operation, the first and second icons are displayed on the operating points in the flow of the series of production process,
the plurality of operating points, the line segments, and the first and second icons are located in a production flow display area defined by the first axis and the second axis, and
the controller is configured to execute operations or processing by at least one of the mold clamping mechanism and the injection device as indicated by the first and second icons at timings defined by the first axis and the second axis and indicated by the operating points on which the first and second icons are displayed.

2. The injection molding machine according to claim 1, wherein
the first icon and the second icon are arranged by dragging and dropping the icons by the operator.

3. The injection molding machine according to claim 1, wherein
the display displays the first and second image information in a sequence in which the first and second image information are arranged by the operator, and
the controller executes operations or processing indicated by the first and second operation information associated with the first and second image information displayed on the display, in the sequence in which the first and second image information are arranged.

4. The injection molding machine according to claim 1, wherein
the storage stores third to nth operation information (n being an integer of not less than three) indicating an operation of the first or second mold, an operation of the mold clamping mechanism, an operation of the injection device or processing of retrieving the conditions of the operations, and third to nth image information associated with the third to nth operation information,
the display is a display which is configured to display the third to nth image information, and displays the third to nth image information in a sequence in which the third to nth image information are arranged by the operator, and
the controller executes operations or processing indicated by the third to nth operation information associated with the third to nth image information displayed on the display.

5. The injection molding machine according to claim 1, wherein the first and second operation information indicates at least one of insertion or withdrawal of a core provided for the first or second mold, insertion or withdrawal of an ejector pin configured to remove a product from the first or second mold, and air blowing for removing a resin residue adhering to the first or second mold.

6. The injection molding machine according to claim 1, wherein when executing the operations of the first and second operation information simultaneously, the first and second image information corresponding to the first and second operation information are displayed side by side on the operating point of a same time or same process on the display.

7. The injection molding machine according to claim 1, wherein when executing the operations of the first and second operation information successively, the first and second image information are displayed on two successive operating points on the display.

* * * * *